Oct. 22, 1935.       D. E. DASHER       2,017,951
LEAK DETECTING APPARATUS
Filed May 29, 1931
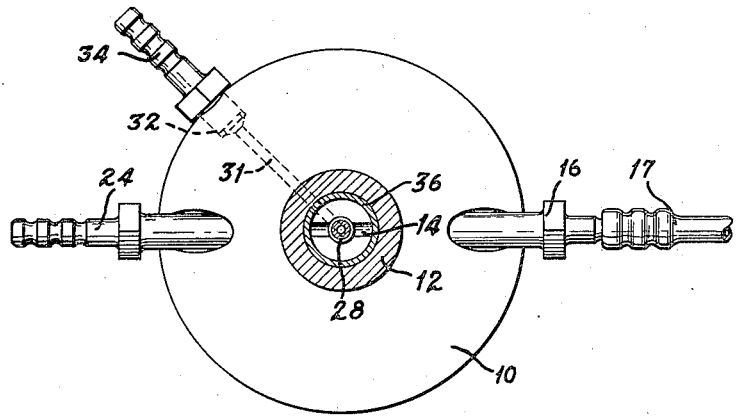
Fig. 2
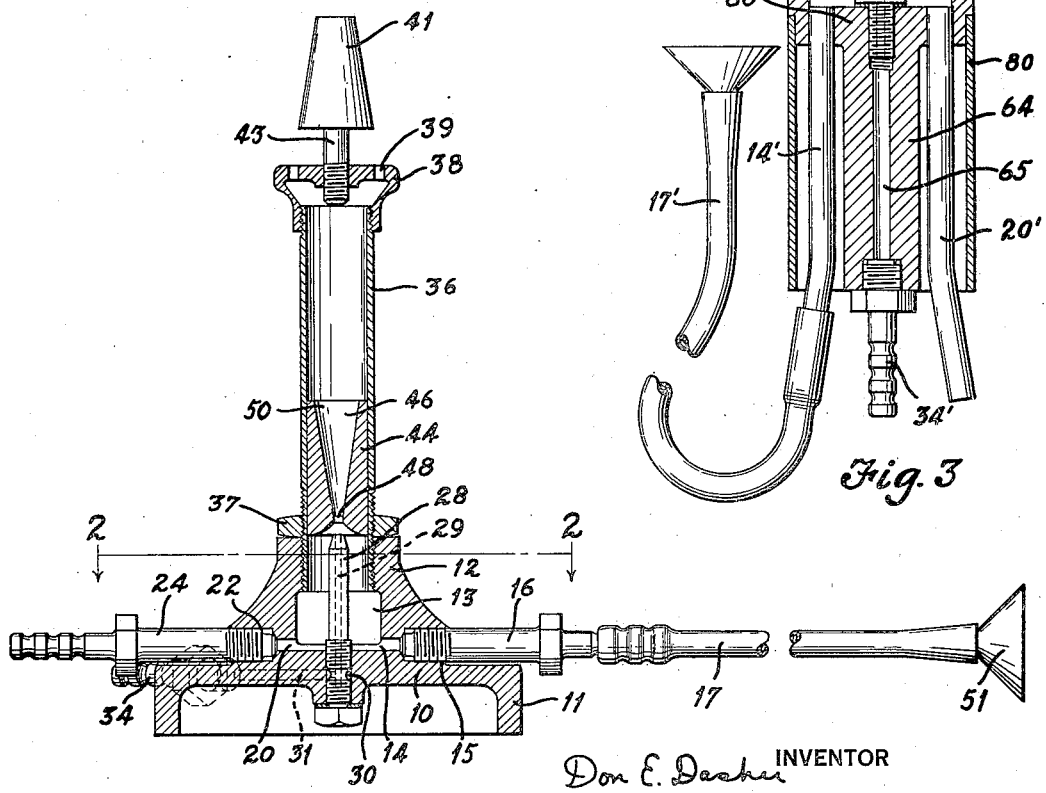
Fig. 3
Fig. 1
Don E. Dasher INVENTOR
BY
Spencer Hardman & John ATTORNEYS Patented Oct. 22, 1935

2,017,951

UNITED STATES PATENT OFFICE 2,017,951

LEAK DETECTING APPARATUS

Don E. Dasher, Dayton, Ohio, assignor, by mesne assignments, to General Motors Corporation, a corporation of Delaware Application May 29, 1931, Serial No. 541,094

2 Claims. (Cl. 23—253)

My invention relates to leak detecting apparatus. It is especially concerned with apparatus for testing for leakage in a refrigerating system employing halogen derivatives and particularly halo-fluoro derivatives of hydrocarbons as refrigerants.

In refrigerating apparatus, refrigeration is produced by the evaporation of a volatile liquid, the vapors being compressed and liquefied and again permitted to evaporate within an evaporator, thus producing either continuous or intermittent refrigeration as may be desired. It will be appreciated that it is essential for refrigerating apparatus to be quite free from leaks, even minute ones. Otherwise either the refrigerant will gradually escape or else air will gradually leak into the apparatus. In either event, the apparatus will gradually produce less and less refrigerating effect, although it is apparently working perfectly in every other respect. Consequently, it is desirable to thoroughly subject the apparatus to tests which will show the existence of the smallest leak before such apparatus is installed and occasionally after the installation of such apparatus. It will also be appreciated that such tests must be of a simple nature for use in the field and inexpensive to perform, particularly where the apparatus is manufactured under quantity production.

The objects of my invention are to provide an improved apparatus for detecting leaks in a closed system, such as a refrigerating system employing a halogen derivative as the refrigerant and more particularly to provide leak detecting apparatus wherein the halogen content of the refrigerant is caused to react with an incandescent metal to form a volatilized metallic halide capable of emitting a characteristic color.

Further objects and advantages of the present invention will be apparent from the following description, reference being had to the accompanying drawing, wherein a preferred form of the present invention is clearly shown.

In the drawing:

Fig. 1 is a sectional view of one form of apparatus;

Fig. 2 is a sectional view taken on the line 2—2 of Fig. 1; and

Fig. 3 is a view in section of a modified form of apparatus.

In Figs. 1 and 2 there is disclosed one form of leak detecting apparatus embodying features of my invention. It consists essentially of a burner having supported in the flame produced thereby a metal, such as copper, and having means for conducting to the heated copper any halogen derivative that may be escaping from the apparatus to be tested.

More specifically, it comprises a base standard indicated at 10 having integral legs 11, and provided with a central upstanding hollowed out portion 12 forming a well 13 in the base standard 10. A passage 14 communicates at one end with the well 13, and has its other end enlarged as shown at 15 to receive the threaded end of the nipple 16, the other end of the nipple 16 being corrugated to receive one end of the flexible exploring tube 17. A second passage 20 has one end communicating with the well 13, and has its other end enlarged as shown at 22 to receive the threaded end of a second nipple 24, the other end of the second nipple 24 being likewise corrugated to receive a compressed air tube, not shown on the drawing.

Extending upwardly through the base portion 10 and threaded thereinto is an upstanding tube 28 provided with a longitudinally extending passage 29 therein. At the lower end of the passage 29 there is formed in the tubular member an annular chamber 30 communicating with one end of a passage 31. The other end of the passage 31 is enlarged as shown at 32 to receive the threaded end of a third nipple 34, the outer end of the third nipple being likewise corrugated to receive a flexible gas line, not shown on the drawing.

Threaded into the upwardly extending portion 12 and locked in position by the lock nut 37, is a tubular member 36 having threaded to its upper end a burner 38 provided with a plurality of openings as shown at 39. A metallic member, herein shown as a copper cone 41, is carried by a rod 43 screw threaded into the burner 38, so as to be carried in the flame produced at the burner. Within and carried by the tubular member 36 is a block 44 provided with the longitudinally extending passage 46. The passage 46 is restricted at one end as shown at 48 and flares outwardly and upwardly as indicated at 50. The restricted end 48 of the longitudinally extending passage is positioned directly above the end of the tubular member 28 and forms in effect a venturi. This arrangement is often called a jet pump.

In the operation of the device disclosed in Figs. 1 and 2, natural gas or any other suitable fuel, passing through the nipple 34, passage 31, the passage 29 in the tubular member 28, and the passage 46, is fed to the burner 38. Compressed air, passing through the nipple 24, the passage 20, well 13, and the passage 46, mixes with the natural gas in the chamber 50 before passing to the burner. Thus a slight blast flame is produced, sufficient to heat the copper cone to incandescence. To detect leaks, the end 51 of the exploring tube 17 is moved slowly around the apparatus to be tested. The air from the vicinity of the apparatus is drawn inwardly through the tube 17 by the action of the compressed air and natural gas passing through the venturi. Any halogen derivative leaking from the apparatus will pass with air through the tube 17. Coming in contact with the incandescent metal 41, the halogen derivative will break down forming free halogen which will react with the copper cone 41 to form a volatilized copper halide. Copper halide when volatilized will emit a bluish-green color, thus indicating a leak.

In Fig. 3 I have shown a modified form of apparatus. The structure comprising the tubular member 36', carrying the block 44', the burner 38', and cone 41', is identical with the structure indicated by like reference characters minus the primes in Figs. 1 and 2. This embodiment differs from that disclosed in Figs. 1 and 2 only in the structure of the base portion. In this modification, the base portion consists of a vertically extending block 60 enlarged at its upper end 61 to form the well 62. The tubular member 36' is threaded into the enlarged portion 61 and communicates with the well 62. A lock nut 37' locks the tubular member 36' in position. At its lower end the block 60 is in the form of a narrow elongated member 64 provided with a passage 65. The upper end of the passage 65 is enlarged to receive the threaded end of a tube 28', which tube 28' has a passage 29' forming a continuation of passage 65. The tube 28' extends upwardly into the tubular member 36' to a point just below the block 44'. At its lower end, passage 65 is enlarged to receive the threaded end of the nipple 34', the other end of the nipple 34' being corrugated to receive a gas tube, not shown.

Two conduits, 14' and 20', corresponding to the passages 14 and 20 shown on Fig. 1, communicate with the well 62, and extend downwardly along the elongated portion 64 to communicate with a conduit 17' and a compressed air line respectively. A skirt 60 depending from the enlarged portion 61 surrounds the conduits 14' and 20'.

The device disclosed in Fig. 3 operates in substantially the same way as the apparatus disclosed in Figs. 1 and 2. Natural gas, passing through the passage 65, the passage 29', and through the opening in the block 44', is fed to the burner 38'. Compressed air passing through the conduit 25, the well 62, is likewise conducted to the burner 38'. The passage of the natural gas and the compressed air through the venturi formed by the block 44' draws inwardly through the exploring tube 14' air from the vicinity of the apparatus to be tested. Any halogen derivative contained in the air in the immediate vicinity of the apparatus to be tested will pass with the air through the tube 14' and, coming in contact with the incandescent copper 41', will break down. The free halogen formed will react with the heated copper to form a volatile metallic halide, which compound will emit a characteristic bluish-green color.

While the form of embodiment of the invention as herein disclosed, constitutes a preferred form it is to be understood that other forms might be adopted, all coming within the scope of the claims which follow.

What is claimed is as follows:

1. Apparatus for detecting leaks in a closed system containing a halogen derivative comprising a burner having venturi means for drawing in air from the vicinity of said closed system to be tested, a flexible exploring tube connected to the venturi means for conducting the air to be tested, means for conducting fuel to said venturi means to provide a flame, and a metal capable of reacting with free halogen and coloring the flame, said metal being supporting within the flame by the apparatus.

2. Apparatus for detecting leaks in a closed system containing a halogen derivative comprising a burner, a mixing means connected to the burner, means for conducting fuel to said mixing means for providing a flame at the burner, said mixing means including an air sucking means for drawing in air, a flexible exploring tube extending from the air sucking means to the vicinity of the closed system to be tested for rapidly conducting the air from the point suspected of leakage to the burner, and a metal capable of reacting with a free halogen and coloring the flame, said metal being supported within the flame.

DON E. DASHER.